US008677551B2

(12) United States Patent
Guastella et al.

(10) Patent No.: US 8,677,551 B2
(45) Date of Patent: Mar. 25, 2014

(54) SIZE-ADJUSTABLE WINDSHIELD WIPER ASSEMBLY (76) Inventors: Anthony Guastella, Norwood (AU); Ryan J. Thomas, Fort Worth, TX (US); Ronald C. Roberts, Fort Worth, TX (US); Michael L. Hyer, Benbrook, TX (US)

( * ) Notice: Subject to any disclaimer, the term of this patent is extended or adjusted under 35 U.S.C. 154(b) by 91 days.

(21) Appl. No.: 12/906,021

(22) Filed: Oct. 15, 2010

(65) Prior Publication Data

US 2011/0219563 A1  Sep. 15, 2011

Related U.S. Application Data (63) Continuation-in-part of application No. PCT/AU2009/000320, filed on Mar. 19, 2009.

(60) Provisional application No. 61/257,392, filed on Nov. 2, 2009.

(30) Foreign Application Priority Data

Apr. 15, 2008 (AU) ................................ 2008901843

(51) Int. Cl.
*B60S 1/36* (2006.01)
(52) U.S. Cl.
USPC ................. 15/250.39; 15/250.451; 15/250.43; 15/250.361
(58) Field of Classification Search
USPC ........... 15/250.451–250.454, 250.43, 250.44, 15/250.361, 250.39
See application file for complete search history.

(56) References Cited

U.S. PATENT DOCUMENTS

| 3,408,680 | A |   | 11/1968 | Heller et al. |
| 3,545,028 | A |   | 12/1970 | Poland |
| 3,846,864 | A |   | 11/1974 | Baut et al. |
| 3,922,749 | A |   | 12/1975 | Castleman, Jr. et al. |
| 3,958,295 | A | * | 5/1976 | Green et al. ............... 15/250.39 |
| 4,177,538 | A | * | 12/1979 | Blaiklock et al. .......... 15/250.39 |
| 4,547,925 | A |   | 10/1985 | Blackborow et al. |
| 4,813,095 | A |   | 3/1989 | Sato |
| 4,976,001 | A |   | 12/1990 | Wright |
| D316,673  | S |   | 5/1991 | Rysner et al. |

(Continued)

FOREIGN PATENT DOCUMENTS

| EP | 0427378 A2 | 5/1991 |
| EP | 2098420 A1 | 9/2009 |

(Continued)

OTHER PUBLICATIONS

Written Opinion of the International Preliminary Examining Authority; date mailed Mar. 19, 2010 for PCT/AU2009/000320.

*Primary Examiner* — Mark Spisich
*Assistant Examiner* — Andrew A Horton
(74) *Attorney, Agent, or Firm* — Patton Boggs LLP (57) ABSTRACT A size-adjustable windshield wiper assembly includes a flexible vertebra, a wiper strip, and a curved spline. The flexible vertebra has scores on an upper side of the flexible vertebra for enabling a user to size the flexible vertebra to a desired size. The wiper strip may include grooves for connecting the wiper strip to the flexible vertebra. The curved spline is inserted into a cavity between the underside of the flexible vertebra and the wiper strip, thereby causing the flexible vertebra to form a curve shape such that the wiper strip is capable of closely hugging a surface of a windshield.

13 Claims, 7 Drawing Sheets

(56) References Cited

U.S. PATENT DOCUMENTS

| | | | |
|---|---|---|---|
| 5,038,944 A | 8/1991 | Sorensen et al. | |
| 5,062,175 A | 11/1991 | Buchanan et al. | |
| 5,228,167 A | 7/1993 | Yang | |
| 5,233,721 A | 8/1993 | Yang | |
| 5,307,536 A * | 5/1994 | Lescher | 15/250.43 |
| 5,379,896 A | 1/1995 | Snow et al. | |
| 5,513,412 A | 5/1996 | Longazel | |
| 5,546,627 A | 8/1996 | Chen | |
| 5,655,251 A | 8/1997 | Dileo et al. | |
| 5,661,871 A * | 9/1997 | Scorsiroli | 15/250.452 |
| 5,809,608 A | 9/1998 | Zadro | |
| 5,848,471 A | 12/1998 | Freeland | |
| 5,899,334 A | 5/1999 | Domerchie et al. | |
| 5,906,283 A | 5/1999 | Kump et al. | |
| 5,956,801 A * | 9/1999 | Jeffer et al. | 15/250.452 |
| 6,588,048 B2 | 7/2003 | Ohyama | |
| 6,766,906 B2 | 7/2004 | Charng | |
| 6,779,661 B1 | 8/2004 | Kotlarski | |
| 6,973,697 B2 | 12/2005 | Shen | |
| 7,254,862 B2 | 8/2007 | Hoshino | |
| 7,337,900 B2 | 3/2008 | Reiber et al. | |
| 7,540,062 B1 | 6/2009 | Huang | |
| 2008/0052865 A1 * | 3/2008 | Chiang | 15/250.43 |
| 2009/0199357 A1 | 8/2009 | Thienard | |

FOREIGN PATENT DOCUMENTS

| | | |
|---|---|---|
| WO | WO 97/35751 A1 | 10/1999 |
| WO | WO 2007/042515 A1 | 4/2007 |
| WO | WO 2007/084453 A2 | 7/2007 |
| WO | WO 2009/126986 A1 | 10/2009 |

* cited by examiner

SIZE-ADJUSTABLE WINDSHIELD WIPER ASSEMBLY

CROSS-REFERENCE TO RELATED APPLICATIONS

This application claims the benefit of U.S. Provisional Application No. 61/257,392, filed Nov. 2, 2009, and is a continuation-in-part of International Application No. PCT/AU2009/000320, filed Mar. 19, 2009, which claims the benefit of Australian Patent Application No. 2008901843, filed Apr. 15, 2008. Priority is claimed to all of the above-mentioned applications, and all of the applications are hereby incorporated by reference.

BACKGROUND

1. Field of the Invention

This invention relates generally to devices for wiping a windshield or other surface and in particular to windshield wipers having size adjustability.

2. Description of Related Art

Windshield wipers traditionally include blades of resilient, or flexible material such as rubber, ethylene propylene diene monomer (EPDM), silicone, or other materials. The wiper blades may be moved laterally across a windshield of an automobile to wipe rain, sleet, snow, dirt, or other debris from the windshield to improve the field of vision for the driver of the vehicle. Windshield wipers are available in many different sizes and styles to fit the wide range of vehicle types and sizes owned by drivers today. Because many different sizes of windshield wipers must be available at retail outlets, it is required that stores carry larger inventories of windshield wipers and that the wipers occupy more shelf space in the stores. Additionally, the vast number of different wiper sizes is often confusing to consumers without providing detailed documentation on the proper wiper to use for each type of available vehicle.

SUMMARY

The problems presented in providing a wiper blade that is suitable for vehicles of different models and sizes are solved by the systems and methods of the illustrative embodiments described herein. In one embodiment, a windshield wiper assembly includes a flexible vertebra having concave longitudinal sides forming two support members and a cavity on an underside of the flexible vertebra. The flexible vertebra includes scores on an upper side of the flexible vertebra for enabling a user to break the flexible vertebra to a desired size. The wiper assembly further includes a wiper strip having grooves for engaging the support members of the flexible vertebra for connecting the wiper strip to the flexible vertebra. A curved spline is provided having a length that is not longer than a minimum length of the flexible vertebra. The minimum length is equal to a length from an innermost score from a first end of the flexible vertebra to an innermost score from a second end of the flexible vertebra. The curved spline is inserted into the cavity between the underside of the flexible vertebra and the wiper strip, and the curved spline causes the flexible vertebra to form a curve shape such that the wiper strip is capable of closely hugging a surface of a windshield.

In another embodiment, a size-adjustable windshield wiper assembly includes a flexible vertebra having longitudinal sides forming two support members and a cavity on an underside of the flexible vertebra. A wiper strip includes grooves for receiving the support members of the flexible vertebra for connecting the wiper strip to the flexible vertebra. A curved spline is associated with at least one of the flexible vertebra and the wiper strip. The curved spline includes a length that is not longer than a minimum length to which the flexible vertebra is configured to be sized.

In still another embodiment, a size-adjustable windshield wiper assembly includes a flexible vertebra having longitudinal sides forming two support members and a cavity on an underside of the flexible vertebra. The flexible vertebra includes a plurality of scores for enabling a user to size the flexible vertebra to a desired size. A wiper strip is provided and includes grooves for receiving the support members of the flexible vertebra for connecting the wiper strip to the flexible vertebra. A curved spline is associated with at least one of the flexible vertebra and the wiper strip to impart a biasing force such that the wiper strip is capable of conforming to a surface of a windshield.

In yet another embodiment, a retail display includes a size-adjustable windshield wiper having a flexible vertebra, a wiper strip, and a curved spline. The flexible vertebra and the wiper strip are both of a first length, and the curved spline is of a second length that is less than the first length. A cutting instrument is provided to cut at least one of the flexible vertebra and the wiper strip to a desired length that is equal to or greater than the second length.

Other objects, features, and advantages of the invention will become apparent with reference to the drawings, detailed description, and claims that follow.

DETAILED DESCRIPTION OF THE ILLUSTRATIVE EMBODIMENTS

In the following detailed description of several illustrative embodiments, reference is made to the accompanying drawings that form a part hereof, and in which is shown by way of illustration specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
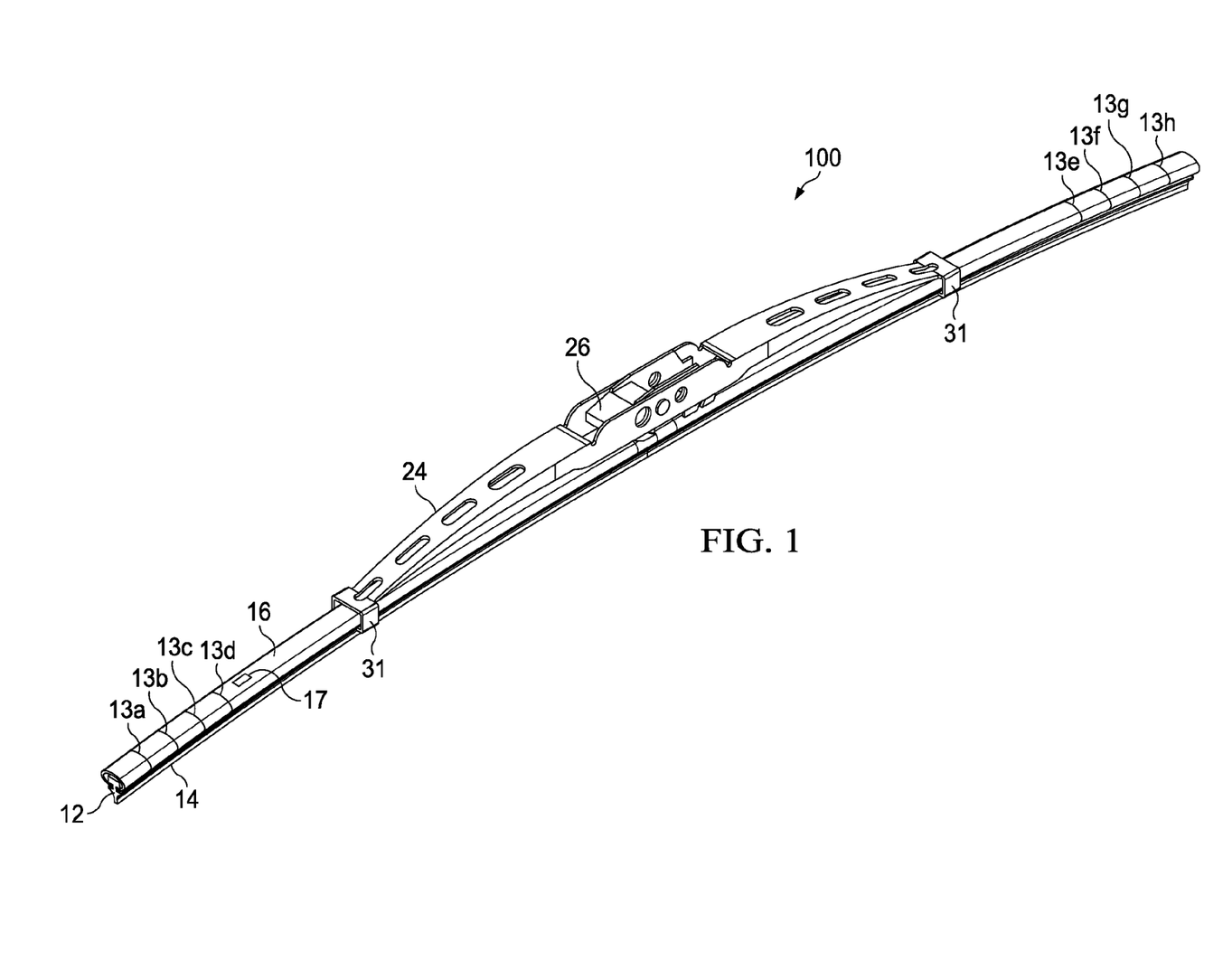
FIG. 1 illustrates a front isometric view of a size-adjustable windshield wiper assembly according to an illustrative embodiment.
Figure 2:
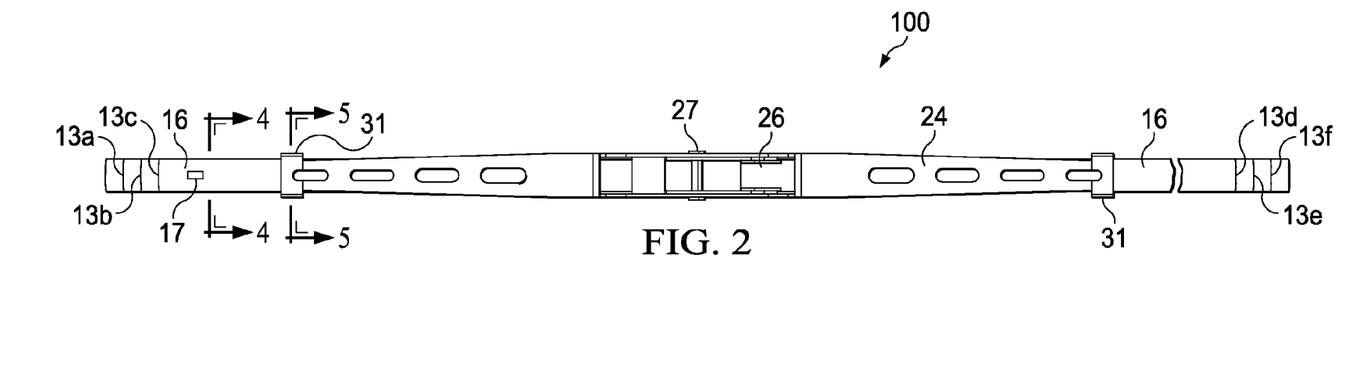
FIG. 2 illustrates a top view of the size-adjustable windshield wiper assembly of FIG. 1.
Figure 3:
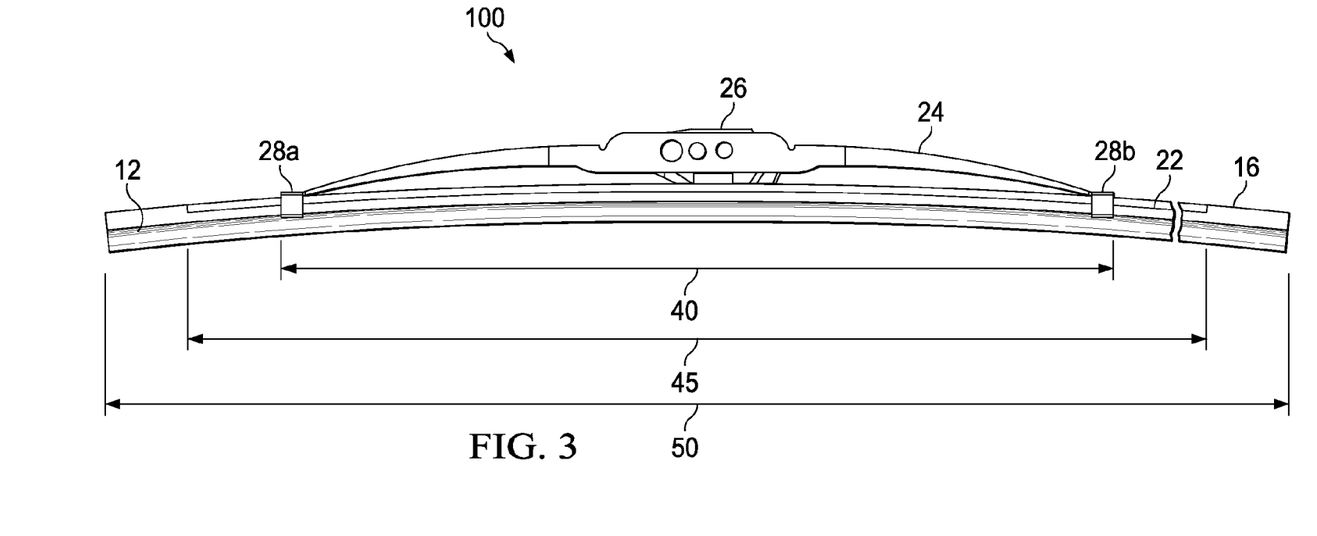
FIG. 3 illustrates a front view of the size-adjustable windshield wiper assembly of FIG. 1.

Referring to FIGS. 1-3, a size-adjustable windshield wiper assembly 100 according to an illustrative embodiment includes a wiper strip 12, a flexible vertebra 16, and a wiper frame 24. The size-adjustable windshield wiper assembly 100 is configured to be moved across a windshield of an automobile or other vehicle such that the wiper strip 12 contacts the windshield to remove water, snow, sleet, dirt, and other debris. As described in more detail herein, the size-adjustable windshield wiper assembly 100 is capable of being sized by a user, thereby making the wiper assembly 100 suitable for use on many different types and sizes of automobiles and other vehicles. Retail establishments are therefore able to sell wiper blades without stocking excessive amounts of inventory or occupying excessive amounts of space on store shelves for multiple sizes. The term "size-adjustable" as referenced herein means capable of being resized by a consumer to a shorter length than an original manufactured length to fit various size windshields.

The wiper frame 24 is attached to the flexible vertebra 16 at connection points 28a and 28b. In certain embodiments, the wiper frame 24 may be removably coupled to the flexible vertebra 16. The location of connection points 28a, 28b may vary in different embodiments. In one embodiment, the wiper frame 24 is attached to the flexible vertebra 16 using claws 31 that wrap around the sides and slightly underneath the flexible vertebra 16. The flexible vertebra 26 at the connection points 28a, 28b may have indentations to more securely receive the claws 31. The indentations may be roughly the same size as the claws 31. The indentations prevent the flexible vertebra 16 from sliding off the wiper frame 24. In other embodiments, the indentations may be slightly larger than the size of the claws 31 (e.g., double the size of the claws 31) to enable some lateral movement between the wiper frame 24 and the flexible vertebra 16.

The wiper frame 24 may be made of any rigid material such as metal or plastic. An adapter 26 is provided to connect the wiper frame 24 to a wiper arm (not shown) of a vehicle such that the wiper assembly 100 may be reciprocally moved across a windshield. The adapter 26 may also be made of any rigid material such as metal or plastic. In one embodiment, the adapter 26 may be rotatable about a pivot bar 27 associated with the wiper frame 24 to allow rotation of the wiper frame 24 relative to the wiper arm. While the adapter 26 may be configured to allow connection to a single type of wiper arm, it is preferred that the adapter 26 be one of universal design that allows connection of the wiper frame 24 to multiple types of wiper arms, including without limitation bayonet-style arms, hook-style arms, pin style arms, or any other style of wiper arm configuration.

Figure 4:
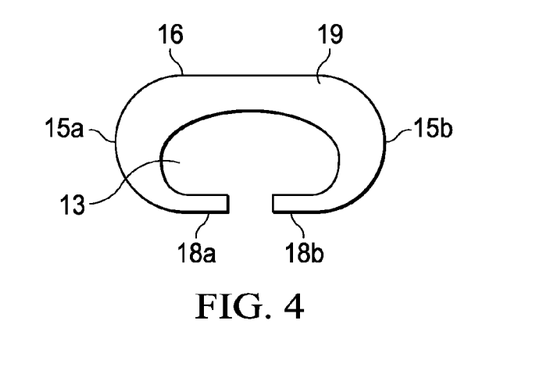
FIG. 4 illustrates a cross-sectional side view of a flexible vertebra of the size-adjustable windshield wiper assembly of FIG. 3, the cross-sectional side view taken at 4-4.

Referring still to FIGS. 1-3, but also to FIG. 4, in one embodiment, the flexible vertebra 16 may be made of any material that is somewhat flexible and is capable of assuming a curved shape. The flexible vertebra 16 may be formed in a curved shape during manufacture, such that in an unstressed, free state the flexible vertebra 16 includes some curvature. A spline 22 may be used in conjunction with the flexible vertebra 16 to impart additional curvature to the flexible vertebra 16. In another embodiment, the flexible vertebra 16 may be void of any curvature in an unstressed, free state, and any curvature developed within the flexible vertebra 16 may be the result of the spline 22.

Referring more specifically to FIG. 4, the flexible vertebra 16 includes a generally concave body 19 having longitudinal sides 15a and 15b that terminate in a pair of support members 18a and 18b. The body 19 defines a cavity 13 that runs the length of the flexible vertebra 16. The cavity 13 is configured to receive the wiper strip 12 such that the support members 18a, 18b are positioned within grooves on an upper portion of the wiper strip 12, as illustrated for example in FIG. 5.

The flexible vertebra 16 include scores or indentations 13 (see FIGS. 1 and 2) on an upper side of the flexible vertebra 16 for enabling a user to break or cut the flexible vertebra 16 to a desired size. For example, in one embodiment, the flexible vertebra 16 may include scores 13a-13d on one end of the wiper flexible vertebra 16 and scores 13e-13h on the other end. In some embodiments, the flexible vertebra 16 may include more or less scores than those illustrated in FIG. 1. Scores 13a-13d may be positioned one inch apart from each other in one embodiment; however, it should be noted that the distance between adjacent scores may vary. In addition, in some embodiments, the flexible vertebra 16 may include a length indicator (e.g., 16", 17", 18", etc.) next to each of the scores 13a-13h for indicating the length of the flexible vertebra 16 associated with each score. In one embodiment, a user may break off one or more segments of the flexible vertebra 16 using scores 13a-13h to create a desired windshield wiper size. For example, a user may create the desired size by breaking off one or more segments from only one end of the flexible vertebra 16. Alternatively, in other embodiments, a user may create the desired size by breaking off one or more segments from both ends of the flexible vertebra 16. As an example, if the original size of the wiper assembly 100 is 24 inches long, and scores positioned on each end of the flexible vertebra 16 are one-half inch apart, a user may snap one one-half inch piece of the flexible vertebra 16 from each end in order to re-size the flexible vertebra 16 to a length of 23 inches.

As referenced herein, the terms "break" or "breaking" may refer to manually snapping a portion of the flexible vertebra off or using a cutting instrument to remove a portion of the flexible vertebra and the wiper strip 12. For instance, in some embodiments, painted lines or other indicia for assisting a user in determining a desired length may replace scores 13a-13h. In still other embodiments, neither scores 13 nor indicia is provided, but rather the flexible vertebra 16 and wiper strip 12 may be broken, torn, or cut at any location along the length of the windshield wiper assembly 100. A user may utilize a cutting instrument, such as, but not limited to, a knife, razor blade, scissors, or a guillotine-type cutter, to remove a portion of the flexible vertebra. In certain embodiments, the cutting instrument may be used to cut other parts of the size-adjustable windshield wiper assembly 100 such as wiper strip 12 (see FIGS. 1-3). In one embodiment, a cutting instrument may be included in the package that contains the size-adjustable windshield wiper assembly 100. The package is then sold as one unit to a consumer. In another embodiment, the cutting instrument may be an integral part of a retail display at which the wipers are sold.

Referring again to FIG. 3, a side view of the size-adjustable windshield wiper assembly 100 depicts illustrative (for example only) lengths associated with the size-adjustable windshield wiper assembly 100. A distance 40 indicates the length between locations 28a and 28b. The distance 40 may vary in some embodiments. Distance 50 depicts the original length of the size-adjustable windshield wiper assembly 100 prior to a user resizing the size-adjustable windshield wiper assembly 100 to a desired size. The length of distance 50 may vary depending on different embodiments. For instance, in some embodiments, the length of distance 50 may be 31", 27", 24", 20", and/or any other predetermined size. In some instances, a user may utilize the size-adjustable windshield wiper assembly 100 using the original length of distance 50 without resizing.

Figure 5:
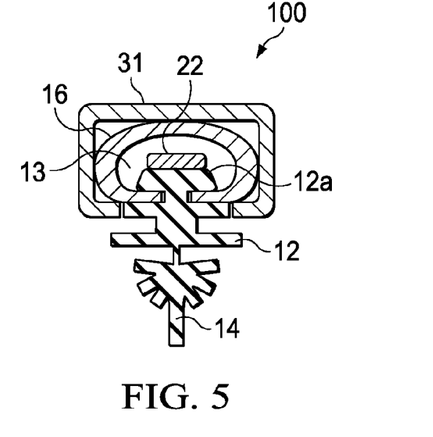
FIG. 5 illustrates a cross-sectional side view of the size-adjustable windshield wiper assembly of FIG. 3 taken at 5-5.
Figure 6:
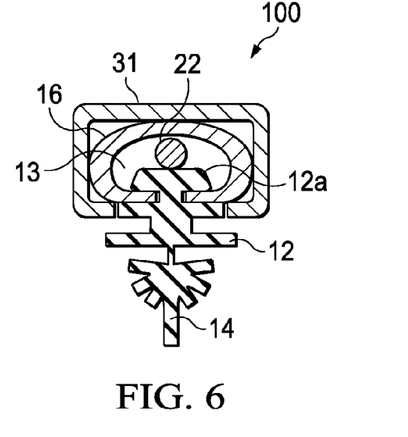
FIG. 6 illustrates a cross-sectional side view of a size-adjustable windshield wiper assembly according to an illustrative embodiment, the cross-sectional side view being similar to that of FIG. 5.
Figure 7:
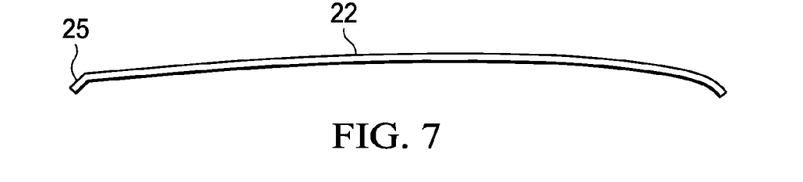
FIG. 7 illustrates a side view of a spline of a size-adjustable windshield wiper assembly according to an illustrative embodiment.

Referring to FIGS. 5-7, the spline 22 is inserted within the cavity 13 of the flexible vertebra 16. The spline 22 is positioned above the wiper strip 12 in the cavity 13. In the embodiment illustrated in FIG. 5, the spline 22 may have a substantially rectangular cross-section. Alternatively, as depicted in FIG. 6, the spline 22 may have a substantially circular cross-section. The spline 22 is curved in an unbiased, free state (see FIG. 7). The spline 22 is inserted into the cavity 13 of the flexible vertebra 16 such that the ends of the spline 22 are curved towards the wiper strip 12. As previously described, the spline 22 may impart a biasing force on the flexible vertebra 16 and the wiper strip 12 to shape the parts in a curved-like shape such that the wiper strip 12 is capable of closely conforming to a surface of the windshield. In one embodiment, the length of the spline 22 (depicted by distance 45 in FIG. 3) is not longer than a minimum length of the flexible vertebra 16. In certain embodiments, the minimum length of the flexible vertebra 16 is equal to a length from an innermost score from a first end of the flexible vertebra 16 (e.g., 13d) to an innermost score from a second end of the flexible vertebra 16 (e.g., 13e) as illustrated in FIG. 1. By maintaining the length of the spline 22 to the minimum length of the flexible vertebra 16, a user may easily resize the size-adjustable windshield wiper assembly 100 to any length larger than or equal to the minimum length of the flexible vertebra 16 by breaking the flexible vertebra 16 without having to cut or resize the spline 22. In addition, the length of the spline 22 is designed to be long enough to provide enough of a biasing force to vertebra 16 and wiper strip 12 to allow the size-adjustable windshield wiper assembly 100 to operate effectively even at the longer, original length of the size-adjustable windshield wiper assembly 100.

In one embodiment, the flexible vertebra 16 includes a notch 17 located on the upper side of the flexible vertebra 16 just inside the innermost score on one end of the flexible vertebra 16. For instance, in the illustrated embodiment of FIGS. 1 and 2, the notch 17 is located just inside score 13d. The notch 17 serves as a stopper for the spline 22 as illustrated in FIG. 2.

Referring still to FIG. 5, a cross-sectional view of the size-adjustable windshield wiper assembly 100 taken at locations 28a and/or 28b is illustrated. The claws 31 of the wiper frame 24 envelop at least a portion of the flexible vertebra 16 to connect the wiper frame 24 to the flexible vertebra 16. An upper head 12a of the wiper strip 12 is received by the cavity 13 of the flexible vertebra 16. As previously mentioned, grooves along the wiper strip 12 are capable of receiving the support members 18a and 18b of the flexible vertebra 16 for connecting the wiper strip 12 to the flexible vertebra 16. The grooves enable the wiper strip 12 to be slid into place along the longitudinal axis of the flexible vertebra 16. The wiper strip 12 defines a longitudinal edge 14 that hugs a surface of a windshield for dispersing water, snow, sleet, dirt, or other debris. The spline 22 is inserted in the cavity 13 and rests on top of the upper head 12a of the wiper strip 12. Although, the spline 22 is depicted as having a rectangular cross-section, the spline 22 could have a round cross-section (e.g., a metal wire) as shown in FIG. 6. Alternatively, any particular cross-sectional shape could be used for spline 22.

When the size-adjustable windshield wiper assembly 100 is in use, the wiper strip 12 is placed with its longitudinal edge 14 abutting a window surface. An abutting load is transferred to the wiper frame 24 and causes the wiper strip 12 to abut the window surface. The abutting load causes the spline 22 to be elastically deformed under the load to follow the surface profile of the window. The spline 22 exerts an opposing biasing load on the wiper strip 12 increasing in magnitude towards the ends of the wiper strip 12. In some embodiments, the curved profile of the spline 22 can be varied to ensure sufficient contact between the longitudinal edge 14 of the wiper strip 12 and a window surface. For example, the curved profile of the spline 22 can be varied under different load conditions and/or different curvatures of a surface profile of a window.

In some embodiments, the spline 22 may include an angled end 25, such as that shown in FIG. 7, to provide frictional engagement between the spline 22 and the wiper strip 12 when installed in the cavity 13. This frictional engagement may aid in preventing longitudinal movement of the wiper strip 12 out of the flexible vertebra 16. End caps (not illustrated) may also be positioned on each end of the flexible vertebra 16 following sizing of the wiper assembly 100 to prevent inadvertent disassembly of the wiper assembly 100 during use.

Figure 8:
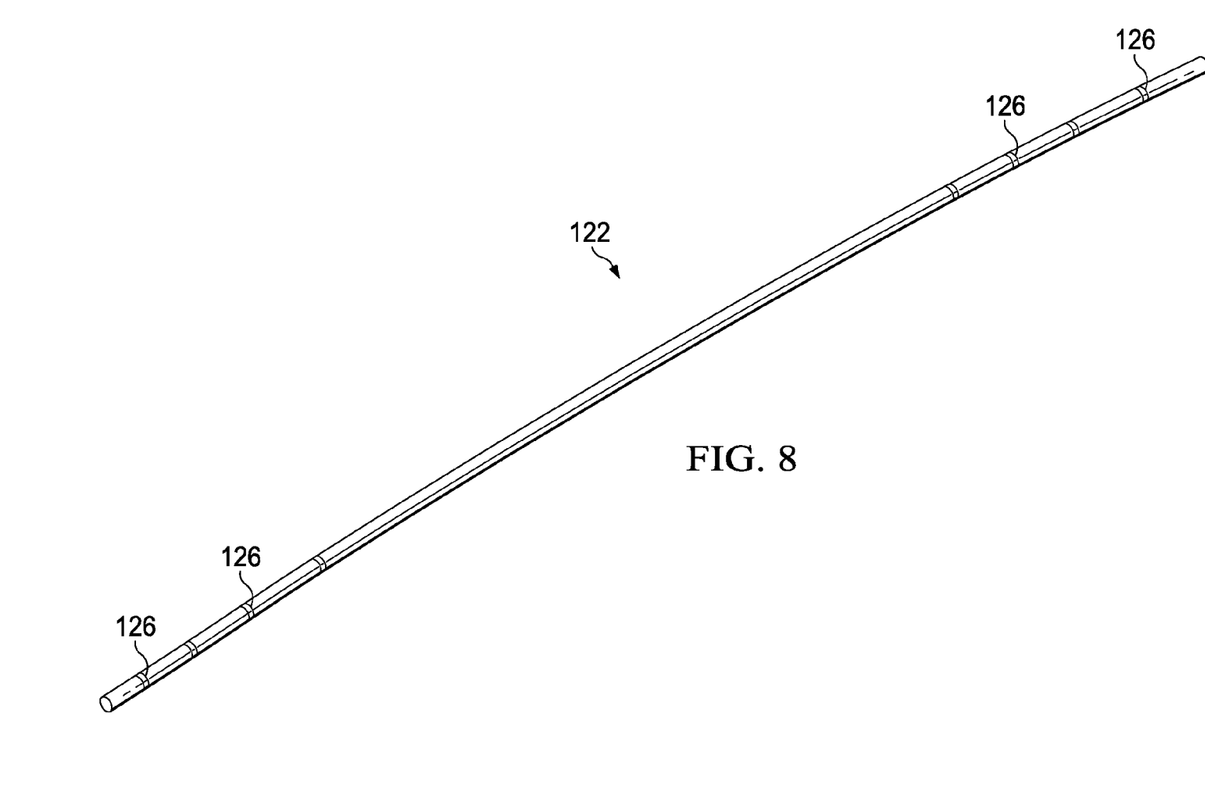
FIG. 8 illustrates an isometric view of a spline of a size-adjustable windshield wiper assembly according to an illustrative embodiment.

Referring to FIG. 8, a spline 122 may be used with the windshield wiper assembly 100 according to an illustrative embodiment. The spline 122 illustrated in FIG. 8 is curved similar to spline 22 of FIG. 7. Spline 122 includes a substantially round cross-section and includes scores or indentations 126 positioned along the spline 122. In one embodiment, each score 126 is a region of decreased cross-sectional area along the length of the spline 122. The scores 126 are provided to enable easy breaking or cutting of the spline 122 to a desired length. Again, spline 122 and the other splines described herein may be formed from metal, plastic, or any other material that is capable of being elastically deformed to impart a biasing force on the wiper strip 12 or flexible vertebra 16 of the wiper assembly 100. While spline 22 has been previously described as possibly having a length less than or equal to the shortest desired, sizable length of the flexible vertebra 16, the spline 22 and also spline 122 may instead be provided in a "full-size" length equal to the original, pre-size-adjusted length of the flexible vertebra 16. In such an embodiment, the presence of scores 126 along the spline 122 may correspond to those scores 13 along the flexible vertebra 16 to enable proper size-adjustability for both the spline 122 and the vertebra 16. While the scored spline 122 of FIG. 8 is illustrated as having a round cross-section, the cross-sectional shape of the spline 122 may be square, rectangular, or any other suitable shape.

Figure 9:
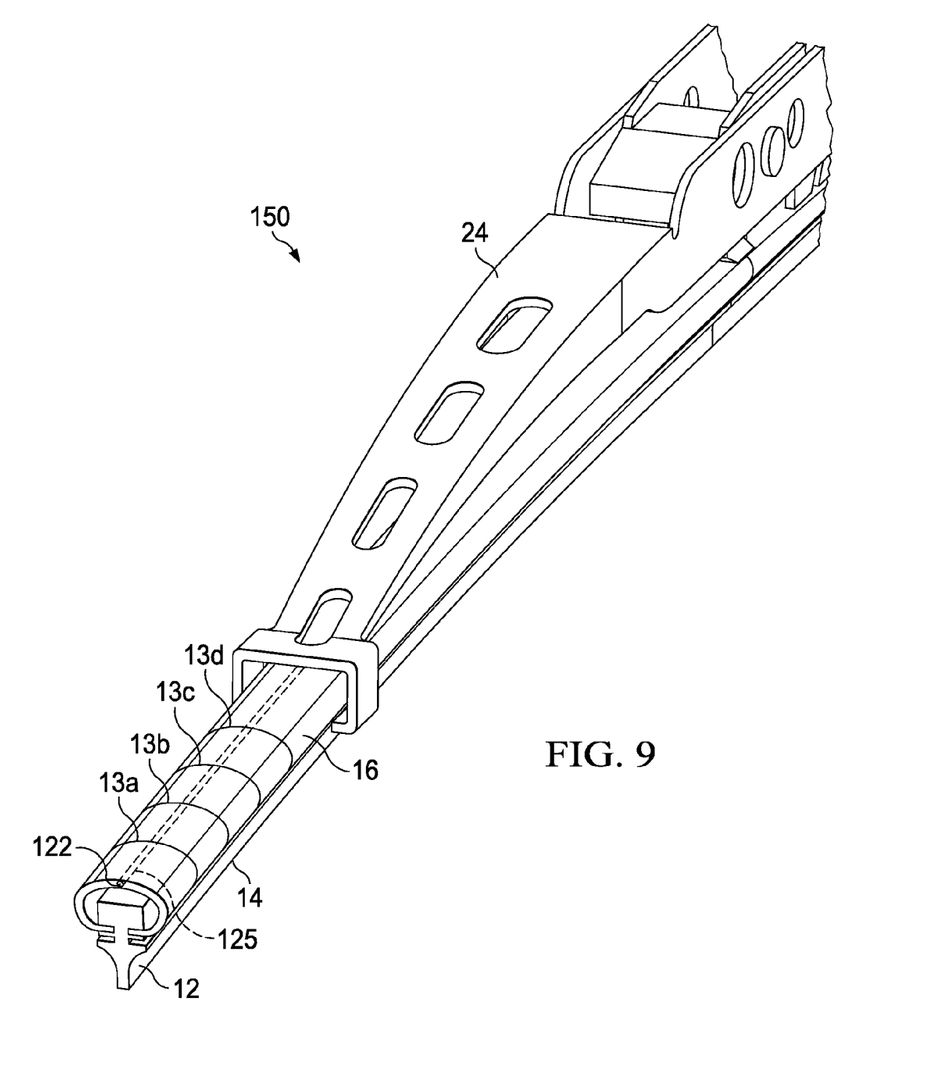
FIG. 9 illustrates a partial, front isometric view of a size-adjustable windshield wiper assembly according to an illustrative embodiment.

Referring to FIG. 9, the placement of spline 122 in a wiper assembly 150 may vary from that described with respect to FIGS. 5 and 6. In FIG. 9, the spline 122 is co-molded or co-extruded into the flexible vertebra 16 such that the spline is within an enclosed channel 125 of the flexible vertebra 16. In this embodiment, the body of the flexible vertebra 16 surrounds the spline 122. As an alternative to co-molding or co-extrusion, the channel 125 may be formed during the manufacture of the flexible vertebra 16 and the spline 122 inserted within the channel 125 afterwards. The functionality of the spline 122 in wiper assembly 150 is similar to the spline used with wiper assembly 100. In the embodiment illustrated in FIG. 9, the spline 122 is the same length as the flexible vertebra 16; however, the spline 122 could be sized similar to spline 22 such that the length of the spline is not longer than the shortest, size-adjusted length of the flexible vertebra 16.

Figure 10:
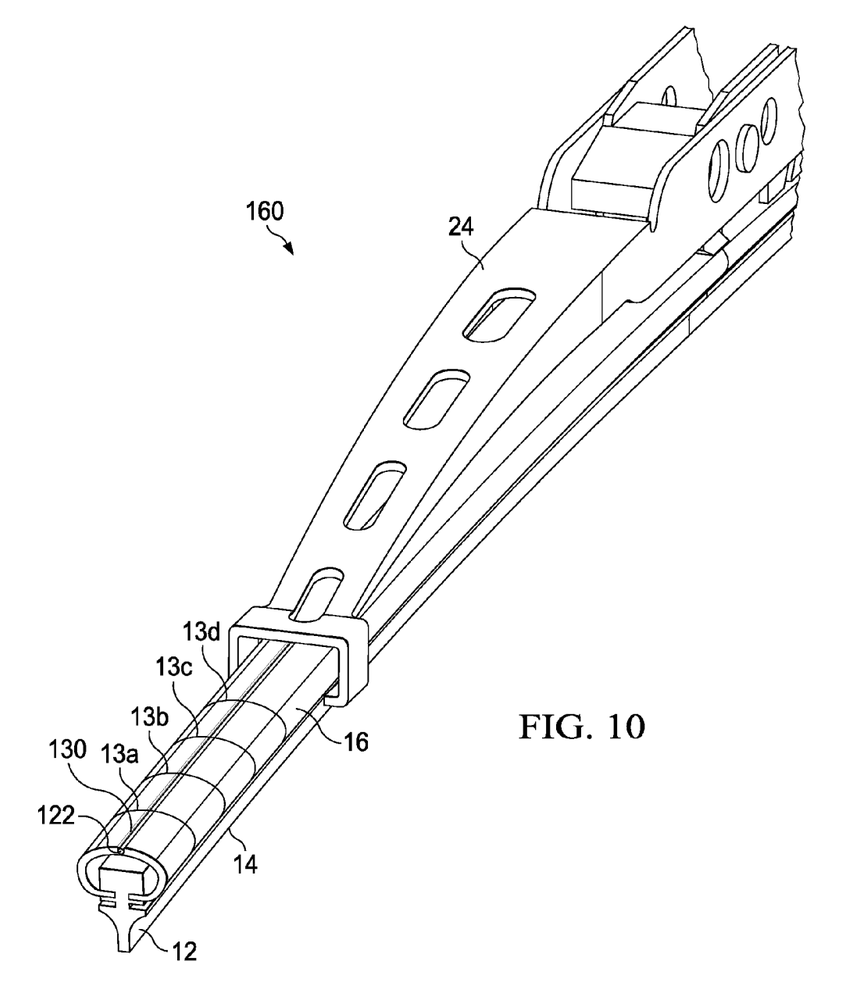
FIG. 10 illustrates a partial, front isometric view of a size-adjustable windshield wiper assembly according to an illustrative embodiment.

Referring to FIG. 10, the placement of spline 122 in a wiper assembly 160 may vary from that described with respect to FIGS. 5 and 6. In FIG. 10, the spline 122 is positioned within a partially open channel 130 formed in an upper portion of the flexible vertebra 16. In this embodiment, the body of the flexible vertebra 16 at least partially surrounds the spline 122, and preferably the spline 122 is capable of being press-fit into the channel 130 such that the spline 122 is retained within the channel 130 during use of the wiper assembly 160. The functionality of the spline 122 in wiper assembly 160 is similar to the spline used with wiper assembly 100. In the embodiment illustrated in FIG. 10, the spline 122 is the same length as the flexible vertebra 16; however, the spline 122 could be sized similar to spline 22 such that the length of the spline is not longer than the shortest, size-adjusted length of the flexible vertebra 16. If the spline 122 is longer and requires re-sizing similar to the flexible vertebra 16, the spline 122 may be resized while residing in the channel 130, or alternatively may be removed from the channel 130 and resized separate from the flexible vertebra 16 and wiper strip 12 prior to being replaced in the channel 130.

Figure 11:
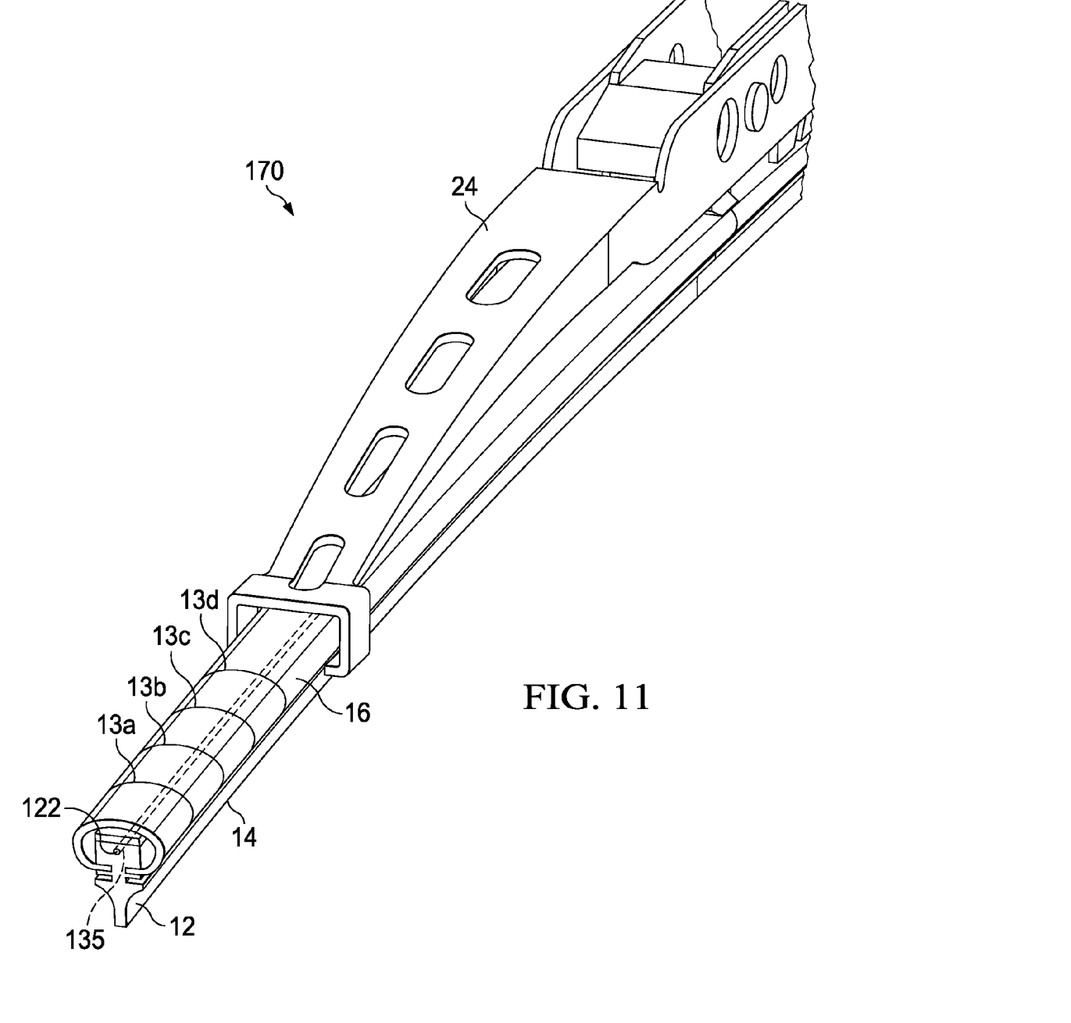
FIG. 11 illustrates a partial, front isometric view of a size-adjustable windshield wiper assembly according to an illustrative embodiment.

Referring to FIG. 11, the placement of spline 122 in a wiper assembly 170 may vary from that described with respect to FIGS. 5 and 6. In FIG. 10, the spline 122 may be co-molded or co-extruded into a portion of the wiper strip 12 such that the spline 122 is within an enclosed channel 135 of the wiper strip 12. In this embodiment, the body of the wiper strip 12 surrounds the spline 122. As an alternative to co-molding or co-extrusion, the channel 135 may be formed during the manufacture of the wiper strip 12 and the spline 122 inserted within the channel 135 afterwards. The functionality of the spline 122 in wiper assembly 170 is similar to the spline used with wiper assembly 100. In the embodiment illustrated in FIG. 11, the spline 122 is the same length as the flexible vertebra 16 and the wiper strip 12; however, the spline 122 could be sized similar to spline 22 such that the length of the spline is not longer than the shortest, size-adjusted length of the flexible vertebra 16.

The embodiments of the size-adjustable windshield wiper assemblies described herein provide a universal sized windshield wiper assembly that can be re-sized by a consumer to fit various size windshields. In addition to the wiper assemblies described herein being used with windshields of vehicles, the wiper assemblies may also be used to clean or wipe windows or non-vehicular surfaces.

It should be apparent from the foregoing that an invention having significant advantages has been provided. While the invention is shown in only a few of its forms, it is not just limited but is susceptible to various changes and modifications without departing from the spirit thereof.

We claim:

1. A size-adjustable windshield wiper assembly comprising:
    a flexible vertebra having longitudinal sides forming two support members and a cavity on an underside of the flexible vertebra, the flexible vertebra having scores on an upper side of the flexible vertebra for enabling a user to size the flexible vertebra to a desired size;
    a wiper strip having grooves for receiving the support members of the flexible vertebra for connecting the wiper strip to the flexible vertebra; and
    a curved spline having a length that is not longer than a minimum length of the flexible vertebra, the minimum length being equal to a length from an innermost score from a first end of the flexible vertebra to an innermost score from a second end of the flexible vertebra, the curved spline being inserted into the cavity between the underside of the flexible vertebra and the wiper strip, wherein the curved spline causes the flexible vertebra to form a curve shape such that the wiper strip is capable of conforming to a surface of a windshield.

2. The size-adjustable windshield wiper assembly of claim 1, further comprising:
    a notch located on the upper side of the flexible vertebra that serves as a stopper for the curved spline.

3. The size-adjustable windshield wiper assembly of claim 1, wherein the curved spline includes an angled end that assists in preventing the wiper strip from sliding out of the flexible vertebra.

4. The size-adjustable windshield wiper assembly of claim 1, wherein the scores on the upper side of the flexible vertebra are positioned one inch apart.

5. The size-adjustable windshield wiper assembly of claim 1, further comprising:
    a length indicator placed next to a score on the upper side of the flexible vertebra to indicate a length of the size-adjustable windshield wiper assembly associated with the score.

6. The size-adjustable windshield wiper assembly of claim 1, further comprising:
    a cutting instrument packaged with the size-adjustable windshield wiper assembly for enabling a user to cut the flexible vertebra or the wiper strip.

7. The size-adjustable windshield wiper assembly of claim 1, further comprising:
    a wiper frame connected to the flexible vertebra, the wiper frame having an adapter for connecting the windshield wiper assembly to a wiper arm of a vehicle.

8. A size-adjustable windshield wiper assembly comprising:
    a flexible vertebra having longitudinal sides forming two support members and a cavity on an underside of the flexible vertebra, the flexible vertebra having a plurality of scores for enabling a user to size the flexible vertebra to a desired size;
    a wiper strip having grooves for receiving the support members of the flexible vertebra for connecting the wiper strip to the flexible vertebra; and
    a curved spline associated with at least one of the flexible vertebra and the wiper strip to impart a biasing force such that the wiper strip is capable of conforming to a surface of a windshield, the curved spline including a plurality of scores.

9. The size-adjustable windshield wiper assembly of claim 8, wherein a length of the curved spline is about equal to a length of the flexible vertebra.

10. The size-adjustable windshield wiper assembly of claim 8, wherein each score of the plurality of scores of the curved spline is aligned with one of the plurality of scores of the flexible vertebra.

11. The size-adjustable windshield wiper assembly of claim 8, wherein the curved spline is positioned in the cavity adjacent the wiper strip.

12. The size-adjustable windshield wiper assembly of claim 8, wherein the curved spline is removably positioned in a channel disposed in an upper portion of the flexible vertebra.

13. The size-adjustable windshield wiper assembly of claim 8, wherein the curved spline is positioned within an upper portion of the wiper strip.

\* \* \* \* \*